(12) United States Patent
Yi et al.

(10) Patent No.: US 8,645,698 B2
(45) Date of Patent: Feb. 4, 2014

(54) METHOD AND NODE FOR GENERATING DISTRIBUTED RIVEST SHAMIR ADLEMAN SIGNATURE IN AD-HOC NETWORK

(75) Inventors: Jeong Hyun Yi, Daejeon (KR); Eunah Kim, Seoul (KR); Alexandra Afanaseva, St. Petersburg (RU); Alexey Fomin, St. Petersburg (RU); Sergey Bezzateev, St. Petersburg (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 1607 days.

(21) Appl. No.: 11/934,977

(22) Filed: Nov. 5, 2007

(65) Prior Publication Data

US 2008/0181413 A1   Jul. 31, 2008

(30) Foreign Application Priority Data

Jan. 25, 2007   (KR) ........................ 10-2007-0008089

(51) Int. Cl.
  *H04L 9/32*  (2006.01)
  *H04L 9/00*  (2006.01)
  *H04L 9/08*  (2006.01)
(52) U.S. Cl.
  USPC ........... 713/176; 713/168; 713/180; 380/277; 380/278; 380/279

(58) Field of Classification Search
  USPC .......... 713/168, 176, 180; 380/277, 278, 279
  See application file for complete search history.

(56) References Cited

U.S. PATENT DOCUMENTS

| 7,136,489 | B1 * | 11/2006 | Madhusudhana et al. .... 380/277 |
| 2001/0016911 | A1 * | 8/2001 | Obana ........................... 713/180 |
| 2006/0023887 | A1 | 2/2006 | Agrawal et al. |
| 2006/0140401 | A1 * | 6/2006 | Johnson et al. ................. 380/44 |

FOREIGN PATENT DOCUMENTS

| KR | 2005-6418 | 1/2005 |
| KR | 2005-100074 | 10/2005 |
| KR | 2006-67787 | 6/2006 |
| WO | WO 2004/028075 | 4/2004 |

* cited by examiner

*Primary Examiner* — Kambiz Zand
*Assistant Examiner* — Jahangir Kabir
(74) *Attorney, Agent, or Firm* — NSIP Law

(57) ABSTRACT

A distributed Rivest Shamir Adleman (RSA) signature generation method in an ad-hoc network and a node of an ad-hoc network. The distributed RSA signature generation method in an ad-hoc network includes distributing key share information, which is generated using a maximum distance separable (MDS) code and a random symmetric matrix, to a plurality of nodes; generating, in a fewer number of nodes than the plurality of nodes, a partial signature using the distributed key share information; transmitting the partial signature to a signature generation node; and generating an RSA signature using the partial signature, in the signature generation node.

26 Claims, 7 Drawing Sheets

US 8,645,698 B2

METHOD AND NODE FOR GENERATING DISTRIBUTED RIVEST SHAMIR ADLEMAN SIGNATURE IN AD-HOC NETWORK

CROSS-REFERENCE TO RELATED APPLICATION

This application claims the benefit of Korean Patent Application No. 2007-8089, filed in the Korean Intellectual Property Office on Jan. 25, 2007, the disclosure of which is incorporated herein by reference.

BACKGROUND OF THE INVENTION

1. Field of the Invention

The following description relates to a distributed Rivest Shamir Adleman (RSA) signature generation method in an ad-hoc network and a node of an ad-hoc network. More particularly, the following description relates to a distributed RSA signature generation method that can generate an RSA signature without interaction among nodes in a distributed RSA signature that distributes a function of a dealer node of a necessary certification authority for management of keys in the ad-hoc network, and can be applied to an additional node corresponding to a new node included in the ad-hoc network, without participation of the dealer node, and a signature generation node for generating an RSA signature.

2. Related Art

Ubiquitous networking indicates that various networks are united based on an Internet Protocol (IP) to provide seamless networking services to a user. When a ubiquitous service is realized using wideband wireless network techniques in the present infrastructure base, problems may arise in that, as users increase, cell range decreases, and expansion of the network infrastructure is needed to overcome the decrease of the cell range. As a result, costs may be increased to maintain the network infrastructure and to build further network infrastructure. Additionally, an entire network may be paralyzed when the network infrastructure fails due to disasters such as war, fire, and flooding. Mobile ad-hoc networks reduce the costs of building the network infrastructure to realize infrastructure-less wireless networking. Features of mobile ad-hoc networks include:

1. Self-organization: All nodes perform functions of a terminal and a router and voluntarily configure the network;
2. Dynamic Topology: Topology of a network changes dynamically due to frequent movements of wireless terminal nodes;
3. Lack of Central Authority: No nodes, or only some nodes, function as a backbone;
4. Lack of Association: It is not easy to control the network (such as controlling node interface and protection against malicious nodes), due to the lack of central authority;
5. No Synchronous Communication: Synchronous communication is impossible due to a feature of the dynamic topology, i.e., when all nodes are simultaneously connected to a network; and
6. Bandwidth and Power Constraints: Limitation on network resources since the network is configured with wireless mobile devices.

Basically, those security requirements on the ad-hoc network are similar to security requirements on other networks. In the case of an ad-hoc wireless network in a distributed computing environment, the use of encryption keys in unreliable circumstances (such as a fully wireless ad-hoc network) is inevitable. The probability of relying on the encryption keys is increased. Accordingly, it is important to build a reliable relation between the encryption keys, and to distribute the encryption keys to the entire ad-hoc network. A distributed signature scheme based on a public key is one solution to the above problem.

In a distributed signature scheme for secure key distribution, a message is encrypted using a secret key from a reliable certification authority. The encrypted message is decrypted using a public key of the reliable certification authority, and validity is verified. However, all nodes on the network are required to perform the function of the reliable certification authority, since a reliable certification authority does not exist in the ad-hoc network. The distributed signature scheme is based on secret sharing. Secret sharing indicates that secret information, such as a secret key, is shared based on a mathematical algorithm, and the secret information is restored using the shared secret. A Shamir method is one of the representative methods based on a polynomial interpolation for the secret sharing.

Polynomial interpolation is a type of algorithm in which a unique t−1-degree polynomial can be defined when at least t different points exist in a two-dimensional space, i.e. after the t−1-degree polynomial is defined and points in the t−1-degree polynomial are distributed, when at least t points are collected, the original polynomial can be found. Polynomial interpolation is suitable for the secret sharing.

FIG. 1 is a diagram of a conventional distributed RSA signature generation method for secure key distribution among nodes in an ad-hoc network. As shown in FIG. 1, a signature generation node 100 requests neighbor nodes 101 and 102 for secret shares of the neighbor nodes 101 and 102. The neighbor nodes 101 and 102 transmit their own secret shares to the signature generation node 100. The signature generation node 100 can generate the RSA signature using the secret shares of the neighbor nodes 101 and 102.

However, there are problems in that at least t points, i.e., at least t nodes, are required to exist simultaneously when using polynomial interpolation, which means communication (interaction) among shareholders having the t points may occur. As a result, information about the shareholders may be leaked.

FIG. 2 is a diagram of a conventional Shamir's distributed RSA signature method. In order to communicate with a plurality of nodes of an ad-hoc network 200 for an RSA signature, a new node 201 communicates with nodes 202 through 204 of the plurality of nodes. This is considered as essential communication, but is not considered interaction. The nodes 202 through 204, having received the request for the signature from the node 201, collect a partial signature generated using the nodes' 202 through 204 own shares to generate a public key. Generally, identification (ID) information of the nodes 202 through 204 is required when generating the partial signature.

However, the conventional Shamir's distributed RSA signature method has problems in that additional communication, such as collecting information from other nodes to generate the partial signature, may occur, i.e., an interaction 205 may occur, and this may create a security problem. There is another problem in that all nodes are required to simultaneously exist in an environment where topology frequently changes, similar to the ad-hoc network 200. Thus, a non-interactive distributed RSA signature method is needed.

SUMMARY OF THE INVENTION

Examples of aspects described herein provide a distributed Rivest Shamir Adleman (RSA) signature generation method in an ad-hoc network, and a node of an ad-hoc network, which can distribute key share information, which is generated using a maximum distance separable (MDS) code and a random symmetric matrix, to a node configuring the ad-hoc network, and can generate an RSA signature using a predetermined plurality of segments of the key share information, thereby sharing a distributed signature generation function without interaction among nodes.

Examples of aspects described herein also provide a distributed RSA signature generation method in an ad-hoc network, and a node of an ad-hoc network, which can generate and transmit new key share information to an additional node added to the ad-hoc network without interaction among nodes.

Examples of aspects described herein also provide a distributed RSA signature generation method in an ad-hoc network, and a node of an ad-hoc network, which can determine validity with respect to a partial signature and key share information using a witness and a partial signature witness, thereby securely sharing a distributed signature generation function.

In one general aspect, a distributed RSA signature generation method in an ad-hoc network is provided. The method includes distributing key share information, which is generated using a MDS code and a random symmetric matrix, to a plurality of nodes; generating, in a fewer number of nodes than the plurality of nodes, a partial signature $S_{ij}$ using the distributed key share information; transmitting the partial signature $S_{ij}$ to a signature generation node; generating an RSA signature using the partial signature; and communicating between nodes securely using the RSA signature.

The method may further provide generating partial key share information using a generator matrix, providing the partial key share information with an additional node, in the plurality of nodes; and generating new key share information using t segments of partial key share information from among the partial key share information, in the additional node. The additional node participates in the generation of the RSA signature using the new key share information.

The method may further provide that the generator matrix includes a feature of a Vandermonde matrix as a matrix to generate the MDS code, and the generating and providing of the partial key share information includes generating partial key share information of the plurality of nodes in accordance with Equation 1:

$$ps_i = ss_i G_l,  \qquad \text{[Equation 1]}$$

where $ps_i$ is the partial key share information, l denotes an identifier of the additional node, $SS_i$ denotes key share information of an i-th node of the plurality of nodes, and $G_l$ denotes an l-th column of the generator matrix G; and the method further includes transmitting the partial key share information $ps_i$ from the plurality of nodes to the additional node.

The method may further provide that the generating of the new key share information includes generating the new key share information using the segments of the partial key share information in accordance with Equation 2:

$$ss_l = (ps_{i_1}, ps_{i_2}, \ldots, ps_{i_t}) \hat{G}^{-1},  \qquad \text{[Equation 2]}$$

where $ps_{i_j}$ is the t segments of partial key share information, $\hat{G}^{-1}$ is an inverse matrix with respect to a partial matrix $\hat{G}$ of the generator matrix G, 'j' ranges $1 \le j \le t$, and the partial matrix $\hat{G}$ is represented as Equation 3, $$\hat{G} = \begin{pmatrix} 1 \bmod \rho & \cdots & 1 \bmod \rho \\ g_{i_1} \bmod \rho & \cdots & g_{i_t} \bmod \rho \\ \vdots & & \vdots \\ g_{i_1}^{t-1} \bmod \rho & \cdots & g_{i_t}^{t-1} \bmod \rho \end{pmatrix}, \qquad \text{[Equation 3]}$$

where $g_{i_j}$ denotes an identifier of a j-th node, and $\rho$ denotes a value greater than or equal to $\max(g_{i_j})$.

In another aspect, a node of an ad-hoc network is provided. The node includes a partial signature receiver to receive a partial signature from a predetermined number of nodes from among other nodes of the ad-hoc network; and an RSA signature generator to generate an RSA signature using the partial signature and a generator matrix having a feature of a Vandermonde matrix. The partial signature is generated in the other nodes using key share information generated using the generator matrix and a random symmetric matrix in a dealer node, and a message signed by a node required for the RSA signature.

The node may further provide a partial key share information processor to generate partial key share information using the generator matrix and the key share information, and to transmit the partial key share information to an additional node. The additional node generates new key share information using t segments of partial key share information from among the partial key share information, and participates in the RSA signature using the new key share information.

Additional aspects and/or features will be set forth in part in the description which follows and, in part, will be obvious from the description, or may be learned by practice of examples of aspects described herein.

BRIEF DESCRIPTION OF THE DRAWINGS

These and/or other aspects and features will become apparent and more readily appreciated from the following description of examples, taken in conjunction with the accompanying drawings of which.

DETAILED DESCRIPTION

Figure 1:
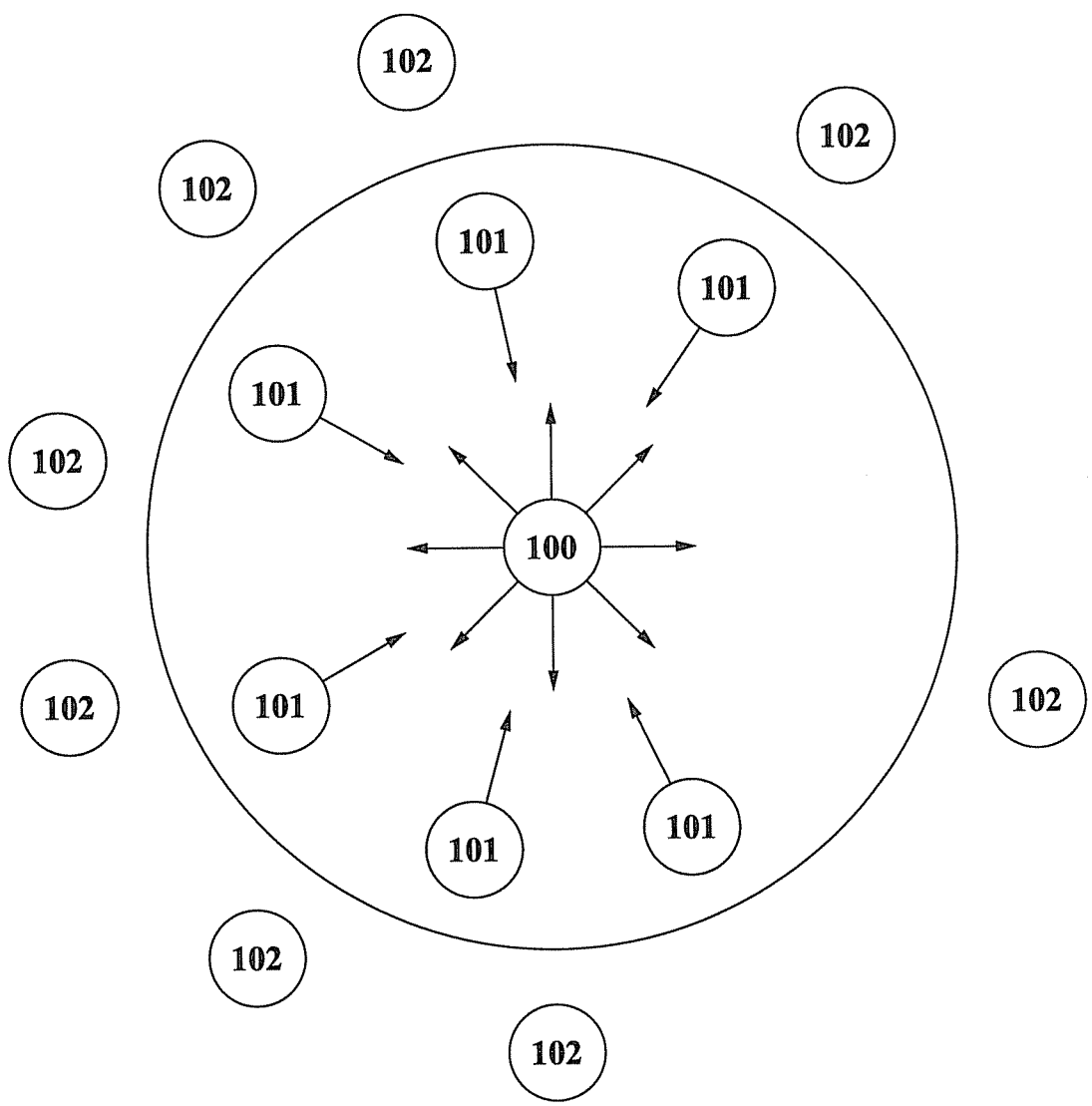
FIG. 1 is a diagram of a conventional distributed Rivest Shamir Adleman (RSA) signature generation method for secure key distribution among nodes of an ad-hoc network.
Figure 2:
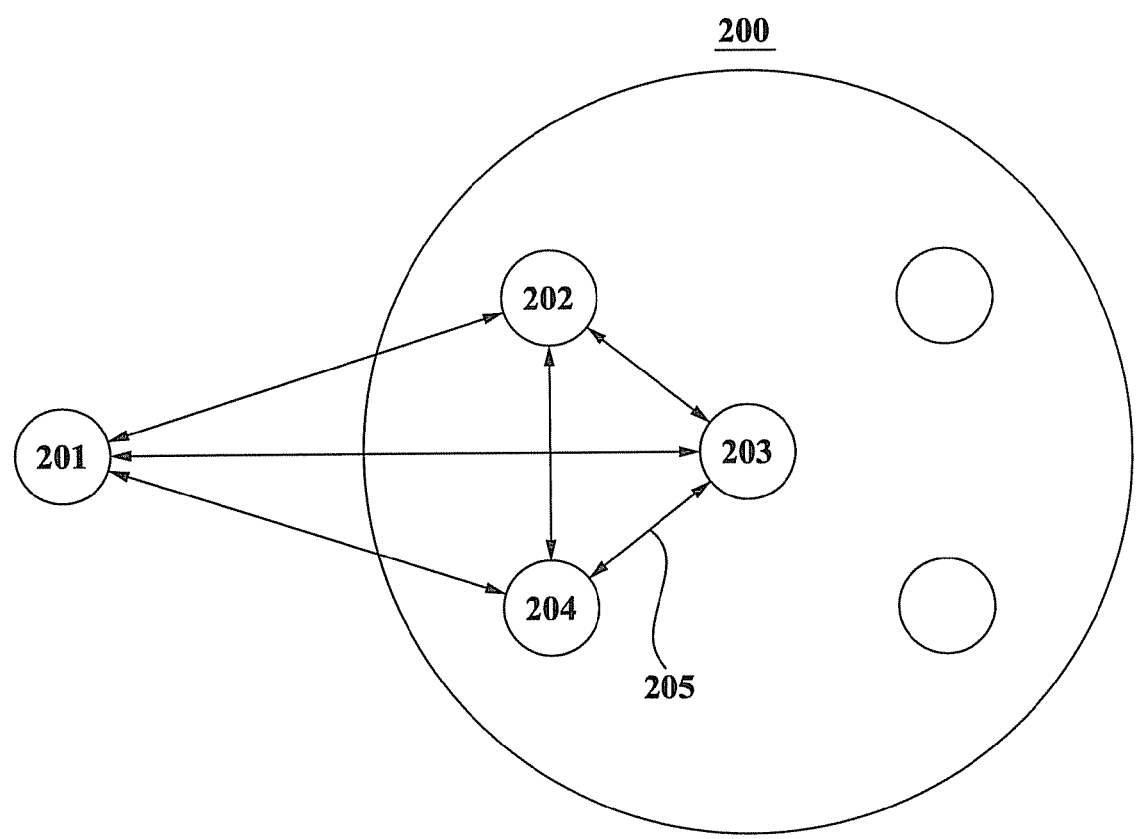
FIG. 2 is a diagram of a conventional Shamir's distributed RSA signature method.

Reference will now be made in detail to, examples which are illustrated in the accompanying drawings, wherein like reference numerals refer to the like elements throughout. The examples are described below in order to explain various aspects by referring to the figures.

I. Background

1 Maximum Distance Separable (MDS) Code

It is assumed that arrays of n elements existing in a finite field GF(r), having of r elements, are n-tuple vectors, and a set of the n-tuple vectors is a vector space GF(r)n. A predetermined vector a included in the GF(r)n is represented as $\alpha=(\alpha_1, \ldots, \alpha_n)$. Hamming weight HW($\alpha$) and a Hamming distance dist($\alpha$, $\beta$) may be defined with respect to vectors included in a predetermined partial vector space of the vector space GF(r)n.

The Hamming weight denotes a number of elements of the n-tuple vectors except zero, and the Hamming distance denotes a number of elements of two different n-tuple vectors that exist in the partial vector space. When the Hamming weight and the Hamming distance are used, the Hamming distance between the predetermined two different n-tuples is represented as Equation 4:

$$HW(\alpha-\beta). \qquad \text{[Equation 4]}$$

A minimum value of the Hamming weight with respect to the vectors in the predetermined partial vector space of the vector space is represented as Equation 5:

$$\min\{dist(\alpha,\beta)|\alpha,\beta \in C, \alpha \neq \beta\}=d. \qquad \text{[Equation 5]}$$

A linear code in the vector space may be defined using the minimum Hamming distance. As an example, a set of R vectors, existing in the partial vector space and having the minimum Hamming distance d, is $(n, R, d)_r$ codes, and an n-tuple vector of the codes of the set is a codeword.

When a code C is the partial vector space of the vector space, generated using t elements, and when a minimum Hamming distance is d, the code C is a linear code. The code C may be represented as a set $[n, t, d]_q$ of vectors, generated by linear combination of t linear independent vectors.

The code C has the following features:
1) A codeword, which is generated by the linear combination of two code words included in the code C, exists in the code C;
2) A codeword in which all elements are zero always exists in the code C; and
3) A minimum Hamming distance of the linear code C is the same as a minimum Hamming weight.

Based on the third feature, the linear code C whose minimum Hamming distance is d is the partial vector space of the vector space whose minimum Hamming weight is d. A dual code may be defined with respect to the code C. When computation $<\alpha, \beta>$ with respect to the codeword $\alpha$ of the linear code $C([n, t, d]_r)$ and a predetermined vector $\beta$ is defined as an inner product of two vectors, a set $C^\perp=\{\beta|<\alpha,\beta>=0, \forall \alpha \in C\}$ may correspond to the dual code. The dual code $C^\perp$ of the linear code C is an (n−t)-dimensional linear code. The number of elements that generate the codeword of the dual code is n−t.

A matrix whose rows are made of the elements that generate the linear code C is a generator matrix G. All code words of the linear code may be generated via linear combination computation with respect to the rows of the generator matrix G. The generator matrix G is t×n sized. A parity check matrix P is a generator matrix with respect to the dual code of the linear code. The parity check matrix P conforms to $\alpha^T P=0$, and is (n−t)×n sized.

The linear code conforms to d≤n−t+1. This linear code is called the Singleton bound or an MDS (maximum distance separable) code. The following 1) through 3) are equivalent with each other with respect to the MDS code.

1) The linear code is $[n, t, n-t+1]_r$ MDS code;
2) When t columns of a generator matrix of the linear code are selected, the selected columns are linearly independent; and
3) A dual code of the linear code is $[n, n-t, t+1]_r$ MDS code.

2. Threshold Scheme from MDS Code

A codeword is generated using a generator matrix of the MDS code to embody a (t,n)-threshold scheme using the MDS code. Each element of the codeword is used for a Rivest Shamir Adleman (RSA) secret key and shares of secret sharing.

A generator matrix G of $[n+1, t, n-t+2]_r$ MDS code C is a t×(n+1) matrix. Through computation aG=c between a predetermined t-tuple information vector a made up of an element $a_i$ of a finite field (GF(r)) and the generator matrix, a unique codeword c included in a linear code C is represented as Equation 6:

$$(\alpha_1, \ldots, \alpha_t)G=(c_0, \ldots, c_n), \qquad \text{[Equation 6]}$$

where a first element $c_0$ of the codeword is taken as a secret key S and the remaining n elements $c_1, \ldots, c_n$ are taken as the shares to be distributed to n protocol join nodes $P_1, \ldots, P_n$. The first element $c_0$ of the secret key S is represented as Equation 7:

$$c_0=\alpha_1 g_{11}+\alpha_2 g_{21}+\ldots+\alpha_t g_{t1}, \qquad \text{[Equation 7]}$$

where $c_0$=S, the secret key.

II. Distributed RSA Signature Generation Method and Signature Generation Node according to Aspects of the Present Invention

II. Distributed RSA Signature Generation Method and Signature Generation Node The following description relates to a distributed RSA signature generation method in an ad-hoc network and a node of an ad-hoc network, which can use the above-described MDS code and the above-described (t, n)-threshold scheme for a distributed RSA signature, thereby sharing a function of a dealer node without the dealer node or interaction, in a plurality of nodes of the ad-hoc network, when an initial dealer node generates and distributes key share information.

The plurality of nodes shares functions of the dealer node, such as generating the distributed RSA signature, providing new key share information to an additional node that intends to participate in the ad-hoc network, and the like, without interaction. However, since interaction is generated when generating and transmitting the new key share information by only the MDS code and the (t, n)-threshold scheme, a random symmetric matrix excluding the above-described predetermined t-tuple vector is used. The distributed RSA signature generation method is described in detail with reference to FIGS. 3 through 6.

Figure 3:
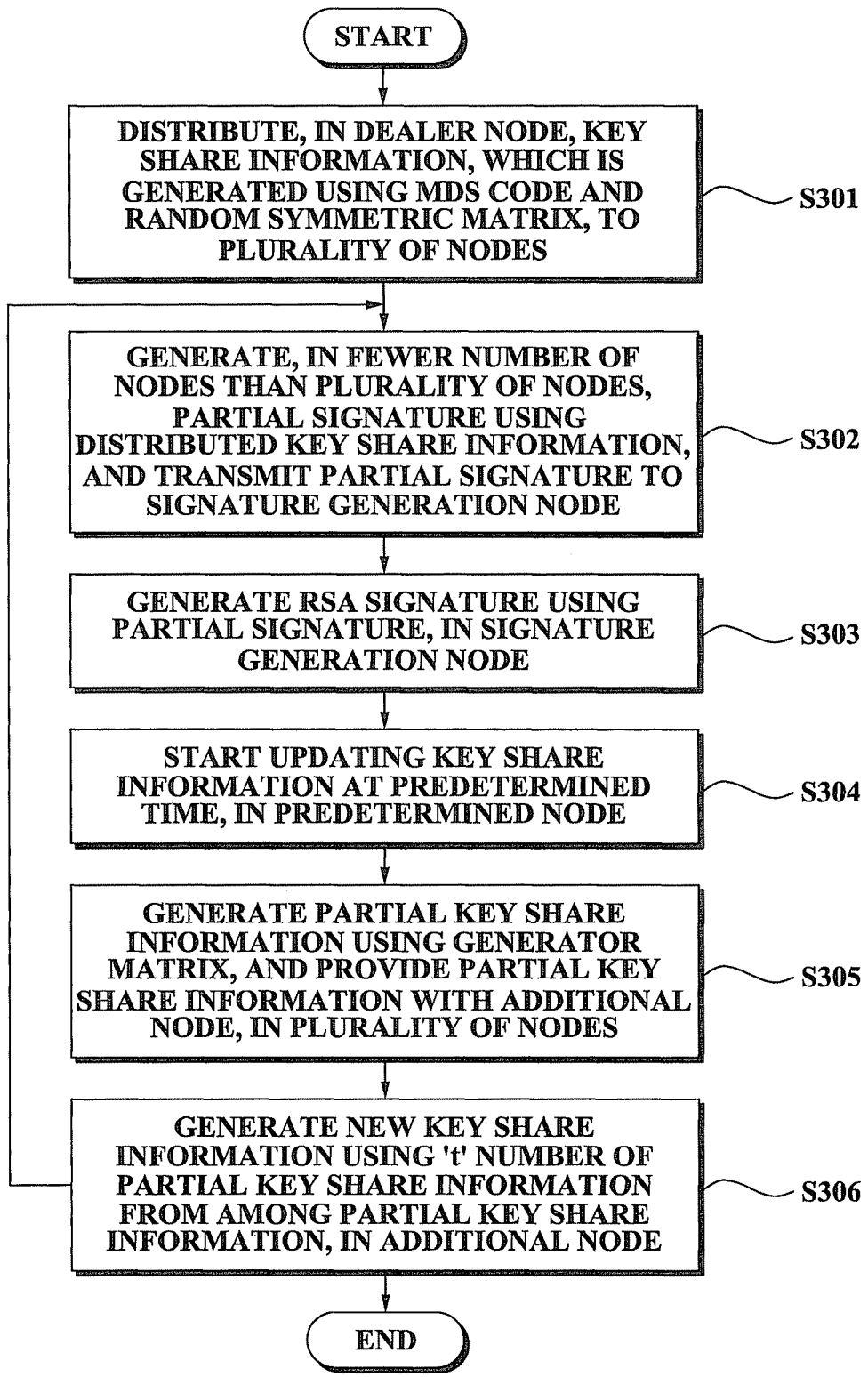
FIG. 3 is a flowchart illustrating an example of a distributed RSA signature generation method.

FIG. 3 is a flowchart illustrating an example of a distributed RSA signature generation technique. According to various aspects described herein, a dealer node, a signature generation node, and neighbor nodes are included in an ad-hoc network. As shown in FIG. 3, at block S301 a dealer node distributes key share information, which is generated using an MDS code and a random symmetric matrix, to a plurality of nodes. An RSA signature is generated using a partial signature generated in fewer nodes than the plurality of nodes. Block S301 includes operations of distributing the key share information, which is generated using a value related to each of the plurality of nodes being n nodes participating in a protocol. The plurality of nodes generate the RSA signature using the distributed key share information in order to transmit a message.

The dealer node uses the MDS code and the random symmetric matrix in order to generate the key share information. The random symmetric matrix has the private key as a first element and is a t×t-sized matrix in which the remaining elements are represented as $D_{i,j} \in (0, \phi(N)-1)$, where $\phi(N)$ is represented as $\phi(N)=(p-1)(q-1)$ of an Euler function, and N denotes the product of the two prime numbers p and q.

The MDS code may include the above-described $[n+1, t, n-t+2]_r$ MDS code to embody the (t, n)-threshold scheme. The (t, n)-threshold scheme is used to generate an RSA signature using t nodes from among n nodes in the ad-hoc network. The dealer node generates a plurality of segments of key share information including information with respect to the secret key, and distributes the plurality of segments to the n nodes. A node required for the RSA signature finds the secret key d using the key share information included in the t nodes.

The key share information is generated using a t×(n+1) sized generator matrix G selected as the MDS code, and the random symmetric matrix D. n+1 segments of key share information are generated. One segment of key share information from among the n+1 segments of key share information includes the secret key, and the remaining n segments of key share information are distributed to n nodes.

A node that acquires t segments of key share information from among the distributed n segments of key share information, finds all the n+1 segments of key share information, and finds the secret key d using the n+1 segments of key share information. The secret key d is shared by the n nodes. The RSA signature is generated using the shares included in t nodes.

Figure 4:
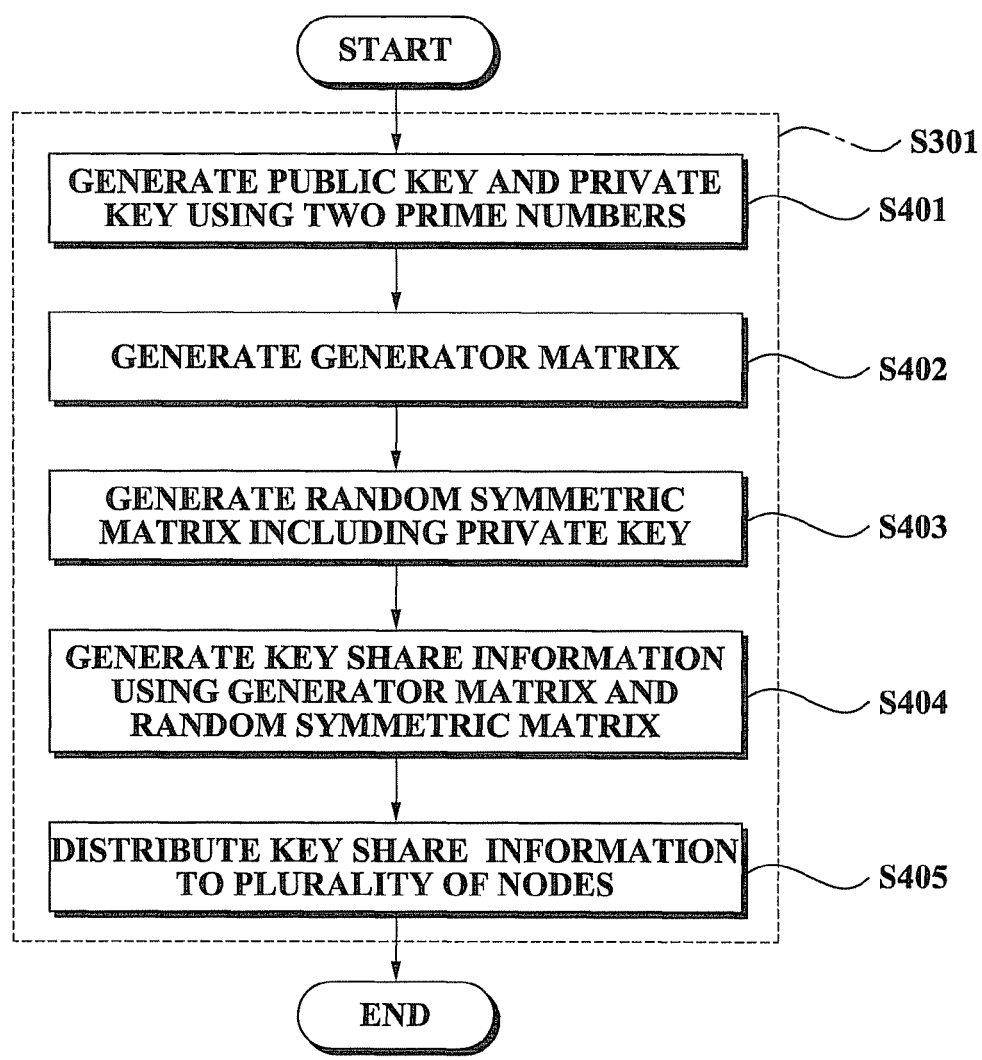
FIG. 4 is a flowchart illustrating an example of a method of generating and distributing, in a dealer node, key share information.

A technique of distributing the key share information, which is generated using the MDS code and the random symmetric matrix, is described in detail with reference to FIG. 4. FIG. 4 is a flowchart illustrating an example of a technique of generating and distributing, in a dealer node, key share information. Blocks S401 through S405 are included in block S301 shown in FIG. 3.

At block S401, a dealer node generates a public key and a private key using two prime numbers. The two prime numbers p and q are used as an RSA parameter in order to generate public keys e and N and a secret key d. The dealer node selects the different prime numbers p and q. A predetermined positive number e ($1<e<\emptyset(N)$) is selected to conform to 'ed≡1 mod $\emptyset(N)$)' when calculating N=pq and $\emptyset(N)$. The dealer node calculates a positive number d ($1<d<\emptyset(N)$) conforming to 'ed≡1 mod $\emptyset(N)$' using the extended Euclidean algorithm, and generates the public keys e and N and the secret key d.

At block S402, the dealer node generates a generator matrix having a feature of a Vandermonde matrix as a matrix for generating the MDS code. The Vandermonde matrix is a t×(n+1) sized matrix whose t columns are linearly independent. The dealer node generates the generator matrix G in accordance with Equation 8:

$$G = \begin{pmatrix} 1 & 1 \bmod \rho & \ldots & 1 \bmod \rho \\ 0 & g_1 \bmod \rho & \ldots & g_n \bmod \rho \\ 0 & \vdots & \ldots & \vdots \\ 0 & g_1^{t-1} \bmod \rho & \ldots & g_n^{t-1} \bmod \rho \end{pmatrix},$$ [Equation 8]

where G is t×(n+1) sized, n denotes a number of the plurality of nodes, t denotes a number of required nodes for RSA signature generation, $g_i$ denotes an identifier of an i-th node, and P denotes a prime number in accordance with a condition P>max($g_i$), and using the feature of the Vandermonde matrix.

At block S403, the dealer node generates the random symmetric matrix including the private key. The random symmetric matrix D has the private key as a first element, and is a t×t-sized matrix in which remaining elements are represented as $D_{i,j} \in (0, \phi(N)-1)$, where $\phi(N)$ is represented as $\phi(N)=(p-1)(q-1)$ of a Euler function and N denotes multiplication of the two prime numbers p and q.

The random symmetric matrix is provided to remove participation of the dealer node and interaction when providing new key share information to a new node that intends to participate in the ad-hoc network. The providing of the new key share information is later described with respect to subsequent blocks S305 and S306 illustrated in FIG. 3.

At block S404, the dealer node generates the key share information using the generator matrix and the random symmetric matrix. The dealer node generates a key share matrix K in accordance with Equation 9:

$$K = (DG)^T$$ [Equation 9]

The key share matrix K is generated as a transposition matrix with respect to vector multiplication of the generator matrix G and the random symmetric matrix D, and generates an i-th row of the key share matrix as i-th key share information $SS_i$ with respect to an i-th node in accordance with Equation 10:

$$ss_i = (K_{i,0}, K_{i,1}, \ldots, K_{i,t-1}).$$ [Equation 10]

At block S405, the dealer node distributes the key share information to the plurality of nodes. The key share information is in n segments, n being the number of the plurality of nodes. The dealer node performs distribution by transmitting, to an i-th node from among the plurality of nodes, i-th key share information from among the n segments of key share information.

Since the random symmetric matrix includes the private key as a first element, the secret key is distributed among a plurality of segments of key share information using vector multiplication of the random symmetric matrix and the generator matrix. When the key share information is distributed to the plurality of nodes, and at least t segments of key share information are collected, the RSA signature is generated. Since a signature generation node generating the RSA signature does not request information with respect to other nodes participating in the RSA signature generation when the above-described distributed RSA signature generation method is used, the RSA signature is generated without the above-described interaction.

Block S301 (shown in FIG. 3) further includes an operation of generating a witness to open the generated witness (not illustrated). The witness is used to check validity of the key share information. The generating of the witness to open the generated witness includes opening the generated witness generating an i-th witness $w_i$ using an identifier of an i-th node, i-th key share information, and multiplication of the two prime numbers; and transmitting the i-th witness $w_i$ to the i-th node. For example, the i-th witness may be generated and transmitted in accordance with Equation 11:

$$w_i = g_i^{K_{i,0}} \bmod N$$ [Equation 11]

Returning to FIG. 3, at block S302 a fewer number of nodes than the plurality of nodes generates a partial signature using the distributed key share information and transmits the partial signature to a signature generation node. The fewer number of nodes generates a partial signature witness to check validity of the partial signature, and transmits the partial signature and the partial signature witness to the signature generation node. Operations of block S302 are described in detail with reference to FIG. 5.

Figure 5:
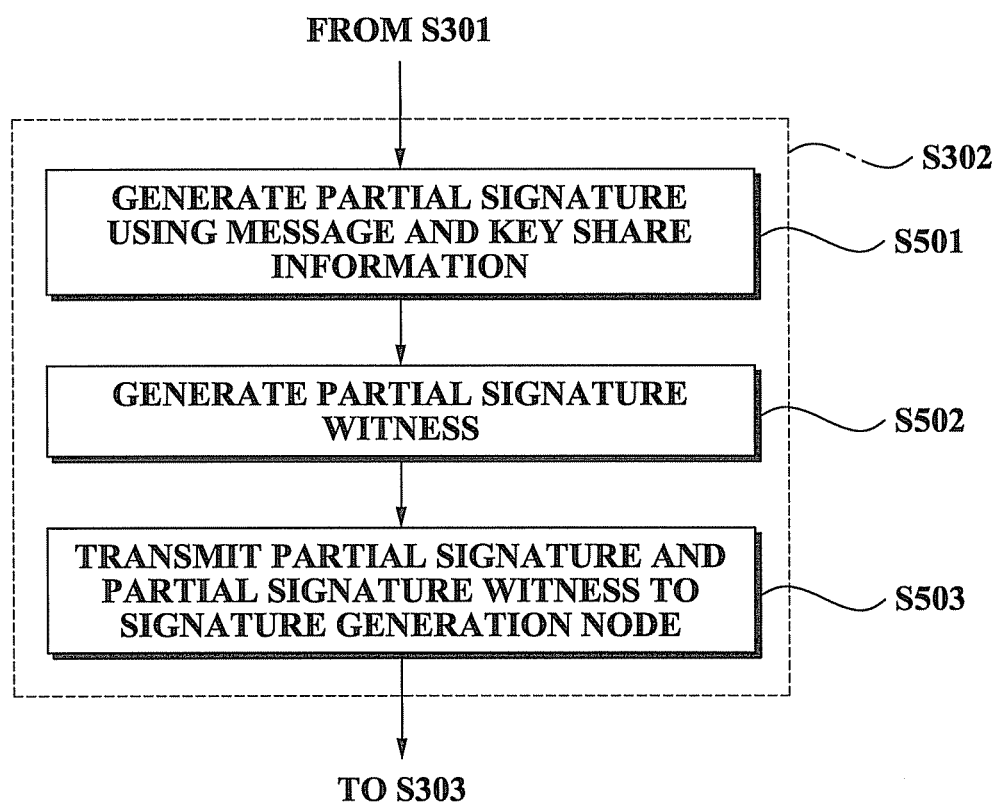
FIG. 5 is a flowchart illustrating an example of a method of generating a partial signature, and transmitting the partial signature to a signature generation node.

FIG. 5 is a flowchart illustrating an example of a technique of generating a partial signature and transmitting the partial signature to a signature generation node. Since the secret key is found using the shares included in t nodes from among the plurality of nodes, generating the RSA signature using the secret key and generating the RSA signature using the shares included in the t nodes cause an identical result.

However, when the key share information is directly transmitted to a node required for a signature with respect to a message m, and the RSA signature is generated in a state where the message m is included, the key share information is insecure, similar to a case where the secret key d is exposed. Accordingly, when nodes including the key share information generate a partial signature and transmit the partial signature to the signature generation node required for the RSA signature, the signature generation node enables a complete RSA signature to be generated using t partial signatures.

At block S501, the plurality of nodes generates the partial signature using a message to transmit using the RSA signature and the key share information. The plurality of nodes and, more particularly, t nodes, which are required to generate the RSA signature from among the plurality of nodes, generates the partial signature using a first element $K_{i,0}$ included in the message m and the key share information in accordance with Equation 12:

$$S_i(m) = m^{K_{i,0}} \bmod N,\qquad\text{[Equation 12]}$$

where N denotes multiplication of two prime numbers p and q to generate a private key and a public key.

Table 1 compares a calculation amount with respect to the partial signature and existing methods.

TABLE 1

| | Partial signature calculation | Signature combining procedure |
|---|---|---|
| Shoup's Scheme | $\log(N) + 48t$ | $48t^2$ |
| Bi-variate polynomials | $\log(N) + (2 * 48)t$ | $48t^2$ |
| Patent | $\log(N) + 2 * 48 + t$ | $48t^2$ |

Examining Table 1, although costs required for a signature combining procedure are identical ($48t^2$) among signature combining procedures in two conventional arts, Shoup's Scheme and Bi-variate polynomials, and a distributed RSA signature generation method according to examples of aspects described herein, the partial signature calculation amount of the distributed RSA signature generation method is lowest. The partial signature is generated with the lowest cost according to examples of aspects described herein.

At block S502, the plurality of nodes generates a partial signature witness using the partial signature. The plurality of nodes selects a random number in a predetermined set. A hash value is generated using the random number, the partial signature, and the message to transmit. The partial signature witness is generated using a key share matrix, the key share information, and the random number.

The random number r is an element of the set (0, . . . , $2^{\log_2 N + 2L_H} - 1$), where $L_H$ denotes the length of the hash. The plurality of nodes generates the hash value using a hash function H in accordance with Equation 13:

$$H(g_i, m, w_i, S_i(m), g'_i, m')\qquad\text{[Equation 13]}$$

where $g_i$ denotes an identifier of an i-th node, m denotes a message to transmit using the RSA signature, $g_i'$ denotes a value of $g_i^r \bmod N$, $S_i(m)$ denotes a partial signature with respect to the i-th node, and m' denotes a value of $m^r \bmod N$. Any hash function may be used as the hash function H. The plurality of nodes generates the partial signature witness z using an equation in accordance with Equation 14:

$$z = K_{i,0} K + r,\qquad\text{[Equation 14]}$$

where K denotes the key share matrix K (the transposition matrix with respect to vector multiplication of the generator matrix and the random symmetric matrix), and $K_{i,0}$ denotes a first element of the key share information distributed to the i-th node.

At block S503, the plurality of nodes transmits the partial signature and the partial signature witness to the signature generation node. The hash value is also transmitted to the signature generation node. The signature generation node determines validity of the partial signature using the hash value, the partial signature witness, and the partial signature.

Figure 6:
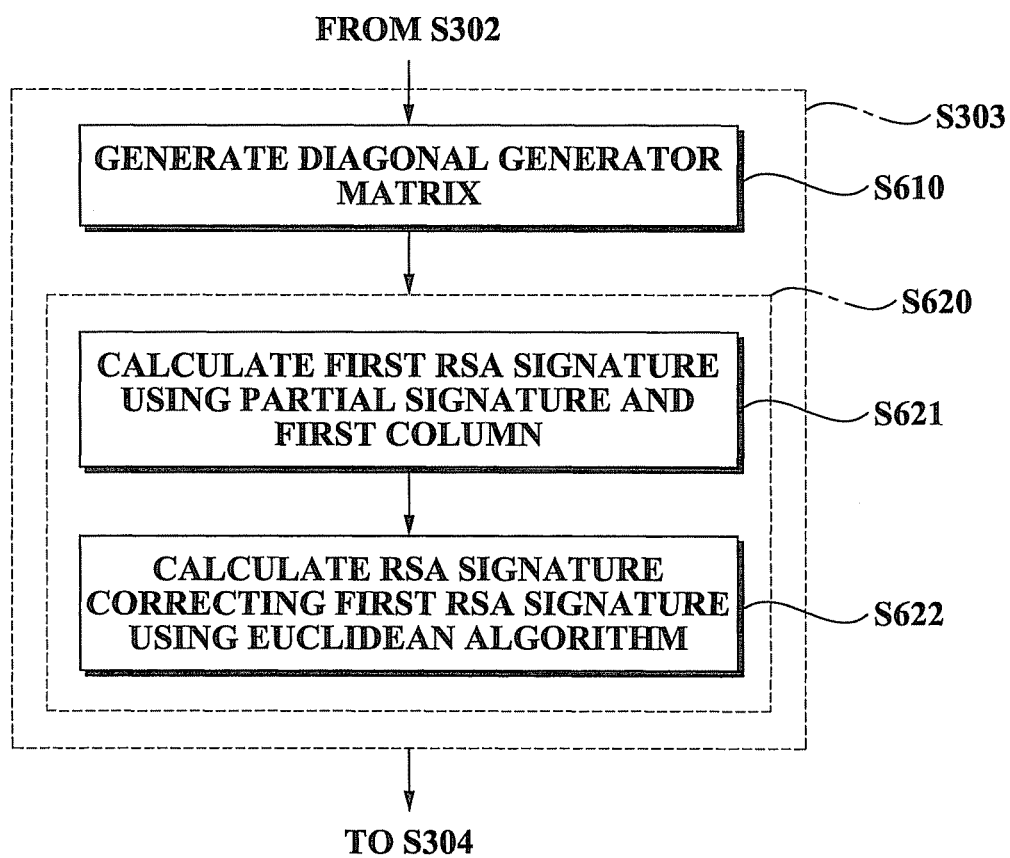
FIG. 6 is a flowchart illustrating an example of a method of generating an RSA signature, in an signature generation node.

Returning to FIG. 3, at block S303 the signature generation node generates an RSA signature using the partial signature. Block S303 is described in detail with reference to FIG. 6. FIG. 6 is a flowchart illustrating an example of a technique of generating an RSA signature. Blocks S610 and S620 illustrated in FIG. 6 are part of block S303 shown in FIG. 3. The signature generation node generates the RSA signature after determining validity of the partial signature using the partial signature and the partial signature witness generated in a fewer number of nodes than the plurality of nodes, i.e., the t nodes.

At block S610, the signature generation node generates and maintains a diagonal generator matrix in which a column part of the required number generates a diagonal matrix. The diagonal generator matrix is a t×t-sized matrix, and is generated in the dealer node using a generator matrix, which is used to generate the key share information.

The signature generation node generates the generator matrix having a feature of the Vandermonde matrix as a matrix to generate the MDS code. The generator matrix is a matrix in accordance with Equation 8 described above, and uses a matrix similar to the generator matrix used in the dealer node to generate the key share information. The generator matrix is a matrix generated in the signature generation node or shared in the ad-hoc network.

The signature generation node generates the diagonal generator matrix by converting a partial matrix into the diagonal matrix. The partial matrix is a t-number of columns of the generator matrix. The signature generation node generates the diagonal generator matrix in accordance with Equation 15:

$$G' = \begin{pmatrix} g'_{00} & \cdots & \lambda & \cdots & 0 & \cdots & 0 & \cdots \\ \vdots & & 0 & \cdots & \lambda & \cdots & \vdots & \cdots \\ \vdots & & \vdots & & \vdots & \cdots & 0 & \cdots \\ g'_{t0} & & 0 & & 0 & \cdots & \lambda & \cdots \end{pmatrix}\quad\begin{matrix}i_1 & \cdots & i_t\end{matrix}\qquad\text{[Equation 15]}$$

where λ denotes the least common multiple (L.C.M.) of elements of the diagonal matrix, so that the elements of G' become integers. A process of converting the generator matrix into the diagonal generator matrix includes a calculation amount for signature generation in accordance with Equation 16:

$$O(t \log \rho^{2t}) = O(t^2) \log \rho.\qquad\text{[Equation 16]}$$

At block S620, the signature generation node calculates the RSA signature using a remaining column excluding a column converted into the diagonal matrix in the diagonal generator matrix. The remaining column is a first column of the diagonal generator matrix. The signature generation node generates the RSA signature at blocks S621 and S622.

At block S621, the signature generation node calculates a first RSA signature S'(m) in accordance with Equation 17:

$$S'(m) = \left(\prod_{j=1}^{t}(S_{ij}(m))^{g_{j1}}\right) \bmod N, \quad \text{[Equation 17]}$$

using the partial signature $S_{ij}$ and the first column, where 'j' ranges $1 \leq j \leq t$, and 'm' denotes a message to transmit using the RSA signature.

At block S622, the signature generation node calculates the RSA signature correcting the first RSA signature using a Euclidean algorithm. The Euclidean algorithm includes an algorithm to calculate x and y in accordance with $x\lambda + ye = 1$. At block S622, the signature generation node calculates the RSA signature S(m) to correct the first RSA signature using x and y in accordance with Equation 18:

$$S(m) = ((S'(m))^x \cdot m^y) \bmod N, \quad \text{[Equation 18]}$$

and obtaining the message m.

Returning to FIG. 3, a predetermined node of the ad-hoc network starts updating key share information at a predetermined time in operation S304. The predetermined node updates the random symmetric matrix. In operation S304, the predetermined node updates the random symmetric matrix participating in the dealer node.

At block S305, the plurality of nodes generates partial key share information using a generator matrix, and provides the partial key share information with an additional node. The additional node denotes a new node intending to participate in the ad-hoc network. The partial key share information is used so that the plurality of nodes may generate and transmit the new key share information with respect to the additional node without interacting with the dealer node.

The additional node generates the new key share information using the partial key share information generated in the plurality of nodes, without information with respect to the plurality of nodes and the dealer node. Interaction among the plurality of nodes is eliminated. Since the key share information included in each of the plurality of nodes is generated using the random symmetric matrix excluding a simple information vector, the additional node generates the new key share information without participation of the dealer node or interaction. Each of the t nodes generates and transmits, to the additional node, the partial key share information $ps_i$ in accordance with Equation 1:

$$ps_i = ss_i G_l. \quad \text{[Equation 1]}$$

At block S306, the additional node generates new key share information using t segments of partial key share information from among the partial key share information. The additional node generates the new key share information in accordance with Equation 2:

$$ss_l = (ps_{i_1}, ps_{i_2}, \ldots, ps_{i_t}) \hat{G}^{-1} \quad \text{[Equation 2]}$$

where 'j' ranges $1 \leq j \leq t$, using the t segments of partial key share information $ps_{i_j}$ and an inverse matrix $\hat{G}^{-1}$ with respect to a partial matrix $\hat{G}$ of the generator matrix G. The partial matrix $\hat{G}$ is a matrix that selects a column depending on a sequence of the t nodes providing partial key share information, and is represented as Equation 3:

$$\hat{G} = \begin{pmatrix} 1 \bmod \rho & \ldots & 1 \bmod \rho \\ g_{i_1} \bmod \rho & \ldots & g_{i_t} \bmod \rho \\ \vdots & & \vdots \\ g_{i_1}^{t-1} \bmod \rho & \ldots & g_{i_t}^{t-1} \bmod \rho \end{pmatrix}. \quad \text{[Equation 3]}$$

Key share information is distributed to a node configuring the ad-hoc network using an MDS code and a random symmetric matrix. The RSA signature is generated using a predetermined plurality of segments of key share information, thereby sharing a distributed signature generation function without interaction among the nodes. New key share information is generated and transmitted to an additional node added to the ad-hoc network without interaction among the nodes. The distributed signature generation function is securely shared to determine validity with respect to a partial signature and the key share information using a witness and a partial signature witness.

Figure 7:
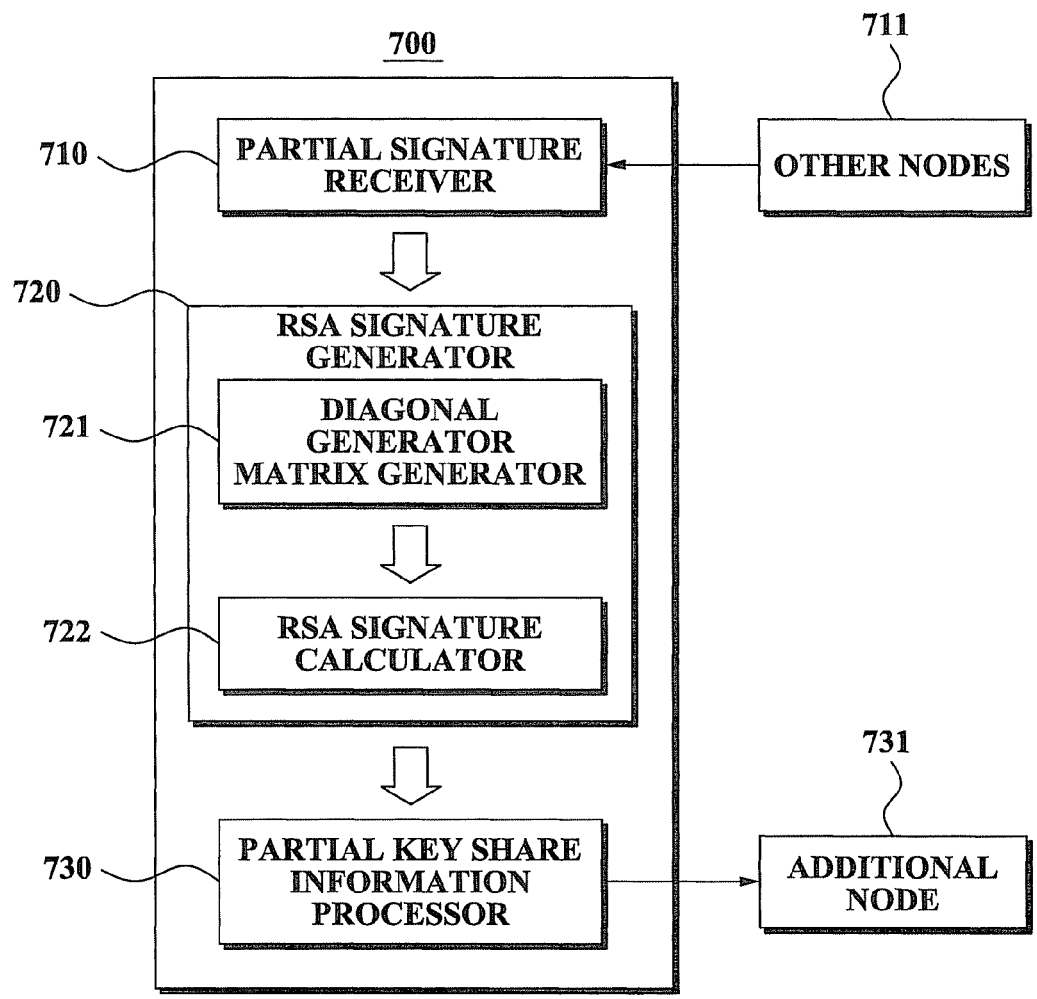
FIG. 7 is a block diagram illustrating an example of an inner configuration of a node of an ad-hoc network.

FIG. 7 is a block diagram illustrating an example of an inner configuration of a signature generation node of an ad-hoc network. A signature generation node 700 includes a partial signature receiver 710, an RSA signature generator 720, and a partial key share information processor 730. According to other aspects, the signature generation node may include additional components, or the functionality of one or more of the above components may be combined into a single unit. The signature generation node 700 may be a portable computer, mobile phone, personal digital assistant, personal entertainment device, or other mobile device.

The partial signature receiver 710 receives a partial signature from a predetermined number of nodes from among other nodes 711 of the ad-hoc network. The partial signature receiver 710 receives the partial signature $S_i$, partial signature witness z, and the hash value H from the predetermined number of nodes. The partial signature receiver 710 generates an RSA signature using the partial signature, calculated from 't' number of nodes from among all nodes of the ad-hoc network.

The partial signature is generated in the other nodes using key share information generated using the generator matrix and a random symmetric matrix in a dealer node, and a message signed by a node required for the RSA signature. The random symmetric matrix has the private key as a first element and is a t×t-sized matrix in which a remaining element is represented as $D_{i,j} \in (0, \phi(N)-1)$, where $\phi(N)$ is represented as $\phi(N) = (p-1)(q-1)$ of an Euler function, and N denotes multiplication of two prime numbers p and q.

Key share information $SS_i$ denotes an i-th row of the key share matrix K in accordance with Equation 9 described above, and is represented as Equation 10 described above. The key share matrix K is a transposition matrix with respect to vector multiplication of the generator matrix G and the random symmetric matrix D in accordance with Equation 8.

The RSA signature generator 720 generates the RSA signature using a generator matrix. The generator matrix is generated using a feature of the Vandermonde matrix and the partial signature. The RSA signature generator 720 includes a diagonal generator matrix generator 721 to generate a diagonal generator matrix in which a column part of the predetermined number generates a diagonal matrix, and an RSA signature calculator 722 to calculate the RSA signature using a remaining column excluding a column converted into the diagonal matrix in the diagonal generator matrix. The generator matrix is a matrix generated in the signature generation node or shared in the ad-hoc network.

The diagonal generator matrix generator 721 generates and maintains a diagonal generator matrix to generate a generator matrix having a feature of a Vandermonde matrix as a matrix for generating the MDS code, and to convert a partial matrix into the diagonal matrix, the partial matrix being a t-number of columns of the generator matrix. The diagonal generator matrix generator 721 converts the generator matrix G into the diagonal generator matrix G' in accordance with Equation 15 described above.

The remaining column is a first column of the diagonal generator matrix. The RSA signature calculator 722 calculates a first RSA signature S'(m) in accordance with Equation 17 described above, and calculates the RSA signature correcting the first RSA signature using a Euclidean algorithm in accordance with Equation 18 described above.

The Euclidean algorithm includes an algorithm to calculate x and y in accordance with $x\lambda+ye=1$. The RSA signature calculator 722 calculates the RSA signature S(m) to correct the first RSA signature using x and y in accordance with Equation 18 described above, and obtains the message m.

The signature generation node 700 receives a partial signature and a partial signature witness. The signature generation node 700 determines validity of the partial signature using partial signature witness received from the t nodes. A partial key share information processor 730 generates partial key share information using the generator matrix and the key share information, and transmits the partial key share information to an additional node 731. The partial key share information processor 730 includes a partial key share information generator (not shown) to generate the partial key share information using the key share information and vector multiplication of specific columns of the generator matrix in accordance with Equation 1 described above, and a partial key share information transmitter (not shown) to transmit the partial key share information to the additional node in the ad-hoc network.

The additional node generates new key share information using t segments of partial key share information from among the partial key share information, and participates in the generation of the RSA signature using the new key share information. The new key share information is generated using the t segments of partial key share information $ps_{i_j}$ and an inverse matrix $\hat{G}^{-1}$ with respect to a partial matrix $\hat{G}$ of the generator matrix G, where 'j' ranges $1 \leq j \leq t$.

The new key share information is generated using partial key share information generated in the signature generation node 700 without participation of a dealer node, and interaction among nodes. Participation of the dealer node and interaction are eliminated, since key share information with respect to each signature generation node 700 is generated using the random symmetric matrix. Nodes in the ad-hoc network according to other aspects may also include components to perform the various functions and operations described above with respect to the FIG. 3-6. For example, the dealer node may include a key generator to generate the public key and the private key, a matrix generator to generate the generator matrix, a random matrix generator to generate the random symmetric matrix, a key share generator to generate the key share matrix using the generator matrix and the random symmetric matrix, and a distributor to distribute each row of the key share matrix to one of a plurality of nodes in the ad-hoc network.

According to examples described herein, it is possible to distribute key share information, which is generated using an MDS code and a random symmetric matrix, to a node configuring the ad-hoc network, and to generate an RSA signature using a predetermined plurality of pieces of the key share information, thereby sharing a distributed signature generation function without interaction among nodes.

According to examples described herein, it is possible to generate and transmit new key share information to an additional node added to the ad-hoc network without interaction among nodes, and to determine validity with respect to a partial signature and key share information using a witness and a partial signature witness, thereby securely sharing a distributed signature generation function.

The above-described examples may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CDs and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of examples described herein.

A distributed RSA signature generation method in an ad-hoc network and a node of an ad-hoc network according to examples described herein can distribute key share information, which is generated using an MDS code and a random symmetric matrix, to a node configuring the ad-hoc network, and generate an RSA signature using a predetermined plurality of pieces of the key share information, thereby sharing a distributed signature generation function without interaction among nodes.

A distributed RSA signature generation method in an ad-hoc network and a node of an ad-hoc network according to examples described herein can generate and transmit new key share information to an additional node added to the ad-hoc network without interaction among nodes.

A distributed RSA signature generation method in an ad-hoc network and a node of an ad-hoc network according to examples described herein can determine validity with respect to a partial signature and key share information using a witness and a partial signature witness, thereby securely sharing a distributed signature generation function.

Although a few examples of aspects have been shown and described, it would be appreciated by those skilled in the art that changes may be made without departing from the principles and spirit of examples described herein, the scope of which is defined in the claims and their equivalents.

What is claimed is:

1. A distributed Rivest Shamir Adleman (RSA) signature generation method in an ad-hoc network, the method comprising:
   distributing key share information, which is generated using a maximum distance separable (MDS) code and a random symmetric matrix, to a plurality of nodes;
   generating, in a fewer number of nodes than the plurality of nodes, a partial signature $S_{ij}$ using the distributed key share information and a message to transmit using an RSA signature;

generating a hash value using a random number, the partial signature $S_{ij}$, and the message, generating a partial signature witness using the partial signature $S_{ij}$;

transmitting the generated hash value, the generated partial signature witness, and the generated partial signature $S_{ij}$ to a signature generation node;

generating the RSA signature using the partial signature; and communicating between nodes securely using the RSA signature, wherein the distributing of the generated key share information, the generating of the partial signature $S_{ij}$, the generating of the hash value, the generating of the partial signature witness, the transmitting of the generated partial signature $S_{ij}$, the generating of the RSA signature, the communicating, or any combination thereof is performed by hardware or a combination of hardware and software.

2. The method of claim 1, further comprising:

generating partial key share information using a generator matrix;

providing the generated partial key share information with an additional node, in the plurality of nodes; and generating new key share information using t segments of partial key share information from among the partial key share information, in the additional node, wherein the additional node participates in the generating of the RSA signature using the new key share information.

3. The method of claim 2, wherein:

the generator matrix includes a feature of a Vandermonde matrix as a matrix to generate the MDS code; and the generating and providing of the partial key share information comprises:

generating partial key share information of the plurality of nodes in accordance with the following equation:

$$ps_i = ss_i G_l,$$

where $ps_i$ is the partial key share information, l denotes an identifier of the additional node, $SS_i$ denotes key share information of an i-th node of the plurality of nodes, and $G_l$ denotes an l-th column of the generator matrix G; and transmitting the partial key share information $ps_i$ from the plurality of nodes to the additional node.

4. The method of claim 2, wherein:

the generating of the new key share information comprises generating the new key share information using the segments of the partial key share information in accordance with the following equation:

$$ss_j = (ps_{i_1}, ps_{i_2}, \ldots, ps_{i_t}) \hat{G}^{-1},$$

where $pS_{i_j}$ is the t segments of partial key share information, $\hat{G}^-$ is an inverse matrix with respect to a partial matrix $\hat{G}$ of the generator matrix G, 'j' ranges $1 \leq j \leq t$, and the partial matrix $\hat{G}$ is represented as:

$$\hat{G} = \begin{pmatrix} 1 \bmod \rho & \ldots & 1 \bmod \rho \\ g_{i_1} \bmod \rho & \ldots & g_{i_t} \bmod \rho \\ \vdots & & \vdots \\ g_{i_1}^{t-1} \bmod \rho & \ldots & g_{i_t}^{t-1} \bmod \rho \end{pmatrix},$$

where $g_{i_j}$ denotes an identifier of a j-th node, and $\rho$ denotes a value greater than or equal to $\max(g_{i_j})$.

5. The method of claim 1, wherein the distributing of the key share information comprises:

generating a public key and a private key using two prime numbers p and q;

generating a generator matrix having a feature of a Vandermonde matrix as a matrix to generate the MDS code;

generating the random symmetric matrix including the private key; and generating the key share information using the generator matrix and the random symmetric matrix.

6. The method of claim 5, wherein:

the Vandermonde matrix is a t×(n+1) sized matrix having t linearly independent columns; and the generating of the generator matrix comprises generating the generator matrix G according to the following equation:

$$G = \begin{pmatrix} 1 & 1 \bmod \rho & \ldots & 1 \bmod \rho \\ 0 & g_1 \bmod \rho & \ldots & g_n \bmod \rho \\ 0 & \vdots & \ldots & \vdots \\ 0 & g_1^{t-1} \bmod \rho & \ldots & g_n^{t-1} \bmod \rho \end{pmatrix},$$

where G is the generator matrix having dimensions of t×(n+1), n denotes a number of the plurality of nodes, t denotes a number of required nodes for generating of the RSA signature, $g_i$ denotes an identifier of an i-th node, and where P denotes a prime number in accordance with a condition $P > \max(g_i)$.

7. The method of claim 5, wherein the random symmetric matrix D has the private key as a first element, and is a t×t-sized matrix in which remaining elements are represented as $D_{i,j} \in (0, \phi(N)-1)$, where $\phi(N)$ is represented as $\phi(N) = (p-1)(q-1)$ of an Euler function, and N denotes multiplication of the two prime numbers 'p' and 'q'.

8. The method of claim 5, wherein the generating of the key share information comprises:

generating a key share matrix K according to the following equation:

$$K = (DG)^T,$$

where K is the key share matrix, G is the generator matrix G, and D is the random symmetric matrix; and generating an i-th row of the key share matrix as i-th key share information $SS_i$ with respect to an i-th node in accordance with $$ss_i = (K_{i,0}, K_{i,1}, \ldots, K_{i,t-1}).$$

9. The method of claim 5, wherein:

the key share information is a number n denoting the plurality of nodes; and the distributing of the key share information further comprises transmitting, to an i-th node from among the plurality of nodes, i-th key share information from among n segments of key share information.

10. The method of claim 5, further comprising:

generating a witness; and opening the generated witness, wherein the generating of the witness comprises:

generating an i-th witness $w_i$ using an identifier of an i-th node, i-th key share information, and a product of the two prime numbers; and transmitting the i-th witness $w_i$ to the i-th node.

11. The method of claim 10, wherein the generating of the witness further comprises generating the witness according to the following equation:

$$w_i = g_j^{K_{i,0}} \bmod N;$$

where $w_i$ is the $i^{th}$ witness, $g_i$ is the identifier of the $i^{th}$ node, $K_{i,0}$ is the $i^{th}$ key share information, and N is the product of the two prime numbers.

12. The method of claim 1, wherein:
the signature generation node is configured to generate the RSA signature after receiving the generated partial signature $S_{ij}$ from the fewer number of nodes for the RSA signature generation; and
the generating of the RSA signature comprises:
generating a diagonal generator matrix in which a column part of the fewer number generates a diagonal matrix; and
calculating the RSA signature using a remaining column excluding a column converted into the diagonal matrix in the diagonal generator matrix.

13. The method of claim 12, wherein:
the generating of the diagonal generator matrix comprises converting a partial matrix into the diagonal matrix to generate the diagonal generator matrix, the partial matrix being a t-number of columns of the generator matrix having a feature of the Vandermonde matrix as a matrix to generate the MDS code; and
the generator matrix is generated in the signature generation node or shared in the ad-hoc network.

14. The method of claim 12, wherein:
the remaining column is a first column of the diagonal generator matrix; and
the calculating of the RSA signature comprises:
calculating a first RSA signature S'(m) according to the following equation:

$$S'(m) = \left( \prod_{j=1}^{t} (S_{ij}(m))^{g_{j1}} \right) \bmod N,$$

where $S_{ij}$ is the partial signature, j ranges $1 \leq j \leq t$, m denotes the message to transmit using the RSA signature, and N denotes multiplication of two prime numbers to generate a private key and a public key; and
correcting the first RSA signature using a Euclidean algorithm to calculate the RSA signature.

15. The method of claim 14, wherein:
the Euclidean algorithm includes an algorithm to calculate x and y in accordance with $x\lambda + ye = 1$; and
the calculating of the RSA signature further comprises:
calculating the RSA signature S(m) to correct the first RSA signature using x and y in accordance with $$S(m) = ((S'(m))^x \cdot m^y) \bmod N; \text{ and}$$

obtaining the message m.

16. The method of claim 1, wherein the generating of the partial signature comprises generating the partial signature according to the following equation:

$$S_i(m) = m^{K_{i,0}} \bmod N;$$

where $S_i(m)$ is the partial signature, m is the message, $K_{i,0}$ is the distributed key share information, and N is a product of two prime numbers.

17. A node of an ad-hoc network, comprising:
a partial signature receiver configured to receive a partial signature, a partial signature witness, and a hash value from a predetermined number of nodes from among other nodes of the ad-hoc network; and
a Rivest Shamir Adleman (RSA) signature generator configured to generate:
an RSA signature using the received partial signature; and
a generator matrix having a feature of a Vandermonde matrix,
wherein:
the partial signature is generated in the other nodes using key share information generated using the generator matrix and a random symmetric matrix in a dealer node, and a message signed by a node required for the RSA signature;
the partial signature witness is generated using the partial signature;
the hash value is generated using a random number, the partial signature, and the message; and
the partial signature receiver, the RSA signature generator, or a combination thereof is implemented as hardware or a combination of hardware and software.

18. The node of claim 17, wherein the random symmetric matrix has a private key as a first element, and is a txt-sized matrix in which remaining elements are represented as $D_{i,j} \in (0, \phi(N)-1)$, where (N) is represented as $\phi(N) = (p-1)(q-1)$ of an Euler function, and N denotes multiplication of two prime numbers p and q.

19. The node of claim 17, further comprising:
a partial key share information processor configured to:
generate partial key share information $ps_i$ using the generator matrix and the key share information; and
transmit the partial key share information to an additional node, the additional node being configured to:
generate new key share information using t segments of partial key share information from among the partial key share information; and
participate in the RSA signature using the new key share information.

20. The node of claim 19, wherein the partial key share information processor comprises:
a partial key share information generator configured to generate the partial key share information $ps_i$ using the key share information and vector multiplication of specific columns of the generator matrix according to the following equation:

$$ps_i = ss_i G_l,$$

where l denotes an identifier of the additional node, $SS_i$ denotes key share information of an i-th node of the plurality of nodes, and $G_l$ denotes an l-th column of the generator matrix G; and
a partial key share information transmitter configured to transmit the generated partial key share information to the additional node.

21. The node of claim 19, wherein:
the new key share information is represented as the following equation:

$$ss_j = (ps_{i_1}, ps_{i_2}, \ldots, ps_i t) \hat{G}^{-1},$$

using t segments of the partial key share information $ps_{i_j}$ and an inverse matrix $\hat{G}^-$ with respect to a partial matrix $\hat{G}$ of the generator matrix G, where j ranges $1 \leq j \leq t$; and the partial matrix is represented as the following equation:

$$\hat{G} = \begin{pmatrix} 1 \bmod \rho & \ldots & 1 \bmod \rho \\ g_{i_1} \bmod \rho & \ldots & g_{i_t} \bmod \rho \\ \vdots & & \vdots \\ g_{i_1}^{t-1} \bmod \rho & \ldots & g_{i_t}^{t-1} \bmod \rho \end{pmatrix},$$

where $g_{i_j}$ denotes an identifier of a j-th node and $\rho$ denotes a value greater than or equal to $\max(g_{i_j})$.

22. The node of claim 17, wherein the RSA signature generator comprises:
   a diagonal generator matrix generator configured to generate a diagonal generator matrix in which a column part of the predetermined number generates a diagonal matrix; and
   an RSA signature calculator configured to calculate the RSA signature using a remaining column excluding a column converted into the diagonal matrix in the diagonal generator matrix,
   wherein the generator matrix is generated in the signature generation node or shared in the ad-hoc network.

23. A node of an ad-hoc network, comprising:
   a key generator configured to generate a public key and a private key using a prime number p and a prime number q;
   a matrix generator configured to generate a generator matrix having a feature of a Vandermonde matrix as a matrix to generate maximum distance separable (MDS) code;
   a random matrix generator configured to generate a random symmetric matrix having the private key as a first element, the random symmetric matrix being a t×t-sized matrix in which remaining elements are represented as $D_{i,j} \in (0, \phi(N)-1)$, where $\phi(N)$ is represented as $\phi(N) = (p-1)(q-1)$ of an Euler function, and N denotes a product of the prime numbers p and q;
   a key share generator configured to generate a key share matrix using the generated MDS code of the generator matrix, and the random symmetric matrix; and
   a distributor configured to distribute each row of the key share matrix to one of a plurality of nodes in the ad-hoc network,
   wherein the key generator, the matrix generator, the random matrix generator, the key share generator, the distributor, or any combination thereof is implemented as hardware or a combination of hardware and software.

24. The node of claim 23, wherein the matrix generator is further configured to generate the generator matrix according to the following equation:

$$G = \begin{pmatrix} 1 & 1 \bmod \rho & \ldots & 1 \bmod \rho \\ 0 & g_1 \bmod \rho & \ldots & g_n \bmod \rho \\ 0 & \vdots & \ldots & \vdots \\ 0 & g_1^{t-1} \bmod \rho & \ldots & g_n^{t-1} \bmod \rho \end{pmatrix},$$

where G is the generator matrix and has dimensions of t×(n+1), t is a number of nodes required to generate a Rivest Shamir Adleman (RSA) signature, n represents a number of the plurality of nodes, $g_i$ is an identifier of the $i^{th}$ node of the plurality of nodes, and P is a prime number satisfying a condition $P > \max(g_i)$.

25. The node of claim 23, wherein the key share generator is further configured to generate the key share matrix according to the following equation:

$$K = (DG)^T,$$

where K is the key share matrix, D is the random symmetric matrix, and G is the generator matrix.

26. A non-transitory computer-readable recording medium storing a program configured to implement a distributed Rivest Shamir Adleman (RSA) signature generation method in an ad-hoc network, the method comprising:
   distributing, in a dealer node, key share information, which is generated using a maximum distance separable (MDS) code and a random symmetric matrix, to a plurality of nodes;
   generating, in a fewer number of nodes than the plurality of nodes, a partial signature using the distributed key share information and a message to transmit using an RSA signature;
   generating a hash value using a random number, the partial signature $S_{ij}$, and the message;
   generating a partial signature witness using the partial signature $S_{ij}$;
   transmitting the generated hash value, the generated partial signature witness, and the generated partial signature $S_{ij}$ to a signature generation node;
   generating the RSA signature using the partial signature; and
   communicating between nodes securely using the RSA signature.

* * * * *